United States Patent
McElroy et al.

(10) Patent No.: US 8,613,147 B2
(45) Date of Patent: Dec. 24, 2013

(54) HINGED NOZZLE VEHICLE DRYING ASSEMBLY

(76) Inventors: Lucian G. McElroy, Carefree, AZ (US); Christopher P. McElroy, Peoria, AZ (US)

(*) Notice: Subject to any disclaimer, the term of this patent is extended or adjusted under 35 U.S.C. 154(b) by 280 days.

(21) Appl. No.: 13/108,149

(22) Filed: May 16, 2011

(65) Prior Publication Data
US 2012/0291308 A1 Nov. 22, 2012

(51) Int. Cl.
*F26B 19/00* (2006.01)

(52) U.S. Cl.
USPC .............. 34/666; 34/232; 15/316.1; 15/30

(58) Field of Classification Search
USPC .......... 34/666, 229, 230, 232; 134/10, 26, 37, 134/316.1; 15/1.7, 320
See application file for complete search history.

(56) References Cited

U.S. PATENT DOCUMENTS

| | | | | |
|---|---|---|---|---|
| 3,349,502 | A * | 10/1967 | Kiefer | 34/216 |
| 4,161,801 | A | 7/1979 | Day et al. | |
| 4,185,399 | A * | 1/1980 | Gladish | 34/120 |
| 4,446,592 | A | 5/1984 | McElroy | |
| 4,589,160 | A | 5/1986 | Day et al. | |
| 4,700,426 | A | 10/1987 | McElroy | |
| 5,184,369 | A * | 2/1993 | McElroy et al. | 15/316.1 |
| 5,280,665 | A * | 1/1994 | McElroy et al. | 15/319 |
| 5,421,102 | A * | 6/1995 | McElroy et al. | 34/541 |
| 5,535,475 | A | 7/1996 | Sauter | |
| 5,553,346 | A | 9/1996 | McElroy | |
| 5,886,648 | A | 3/1999 | McElroy et al. | |
| 5,901,461 | A | 5/1999 | McElroy et al. | |
| 5,950,324 | A * | 9/1999 | McElroy et al. | 34/229 |
| 5,960,564 | A * | 10/1999 | McElroy et al. | 34/666 |
| 6,038,781 | A * | 3/2000 | McElroy et al. | 34/380 |
| 6,176,024 | B1 | 1/2001 | McElroy | |
| 2005/0262719 | A1* | 12/2005 | Calbreath | 34/239 |
| 2010/0269860 | A1* | 10/2010 | Vogel | 134/10 |
| 2012/0291308 | A1* | 11/2012 | McElroy et al. | 34/666 |
| 2012/0298145 | A1* | 11/2012 | Rife | 134/22.18 |

FOREIGN PATENT DOCUMENTS

| | | | | |
|---|---|---|---|---|
| JP | 07293799 | A * | 11/1995 | F17D 1/075 |
| WO | WO 9829309 | A1 * | 7/1998 | B65B 31/04 |

* cited by examiner

*Primary Examiner* — Steve M Gravini
(74) *Attorney, Agent, or Firm* — Dickinson Wright PLLC

(57) ABSTRACT

A support having an inverted U-shape defining a top plenum for distributing air and extending along a top plenum axis and a pair of legs extending downwardly from the top plenum in a spaced and parallel relationship. The top plenum of the support defines an attachment opening at an attachment angle. A bag extends downwardly at the attachment angle from the top plenum to a distal end in an inflated position. A nozzle is disposed the distal end of the bag to define a nozzle opening extending along a nozzle plane. The bag includes a major length and a curved portion. The curved portion of the bag includes a minor length and a filler length. The filler length positions the nozzle to be slanted open at a first nozzle acute angle of 20° forwardly in the inflated position and at a second nozzle acute angle of 20° rearwardly in an up position.

27 Claims, 6 Drawing Sheets

HINGED NOZZLE VEHICLE DRYING ASSEMBLY

BACKGROUND OF THE INVENTION

1. Field of the Invention

The present invention relates to an assembly for removing liquids from surfaces of a vehicle.

2. Description of the Prior Art

Such an assembly is disclosed in the U.S. Pat. No. 5,901,461 to McElroy et al. wherein a support defines a top plenum for distributing air disposed along a top plenum axis defining an attachment opening and a pair of legs are disposed in a support plane extending through the top plenum axis from the top plenum to a support end. The attachment opening is disposed radially from the top plenum axis at an attachment angle relative to the support plane and a bag having an opening is attached to the attachment opening of the top plenum to extend downwardly from the top plenum to a distal end in an inflated and down position while being movable relative to the top plenum in an arc between the down position and an up position. A nozzle is disposed on a nozzle centerline at the distal end of the bag to define a nozzle opening disposed in a nozzle plane transverse to the nozzle centerline.

It has long been recognized as desirable to remove liquids from the surface of a vehicle coming out of a car wash be at the highest degree of liquid removal at the lowest possible horse power in generating the air to remove the liquid. At the same time, it is desirable to remove liquid from large vehicles such as vans and pick-up trucks.

SUMMARY OF THE INVENTION

The invention provides for such assembly for removing liquids from the surface of a vehicle wherein the nozzle plane of the nozzle is slanted open toward the support plane of the legs at a first nozzle acute angle in the down position and is slanted open from the support plane of the legs at a second nozzle acute angle in the up position.

ADVANTAGES OF THE INVENTION

The present invention provides for a faster surface drying rate per vehicles and a more complete drying of the back of the vehicles, especially for the back surface of vans and the back windows of pick-up trucks.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
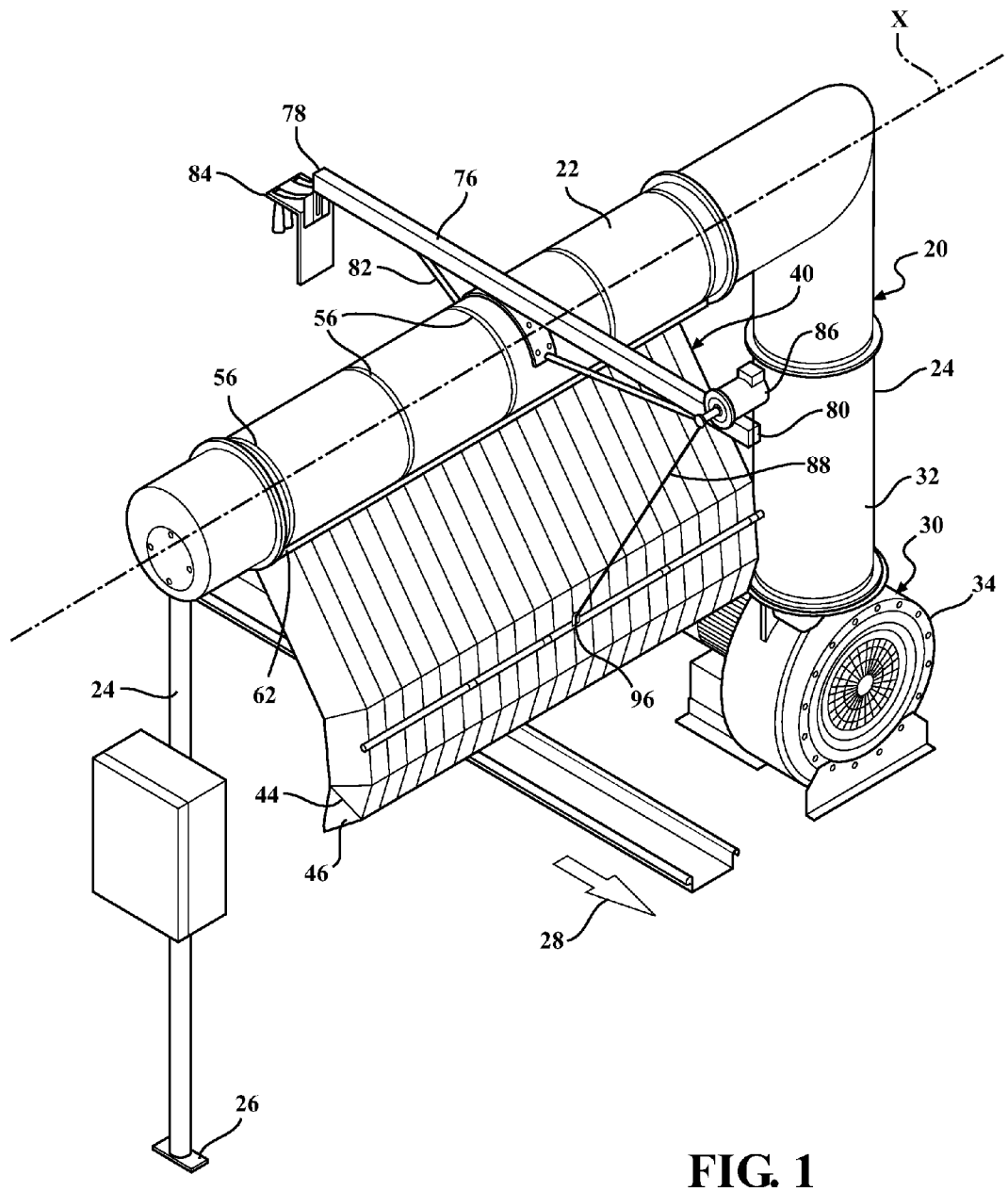
FIG. 1 is a perspective view of a preferred embodiment of the assembly for removing liquids from surfaces of a vehicle constructed in accordance with the subject invention.

Referring to the Figures, wherein like numerals indicate corresponding parts throughout the several views, an assembly for removing liquids from surfaces of a vehicle is generally shown in FIG. 1.

The assembly includes a support 20, as generally indicated, and having an inverted U-shape defining a top plenum 22 for distributing air and extending along a top plenum axis X and a pair of legs 24 extending downwardly from the top plenum 22 in a spaced and parallel relationship to support ends 26 for engaging a floor. The legs 24 of the support 20 being vertically disposed in a support plane $\rho$ extend through the top plenum axis X to define a drive through-lane indicated by an arrow 28.

One of the legs 24 defines an air supply 30, as generally indicated, including a duct 32 for supplying air to the top plenum 22 and a blower 34, comprising a propeller and an electric motor, in fluid communication with the duct 32 for providing a flow of air to the supply duct 32 and the top plenum 22.

Figure 2:
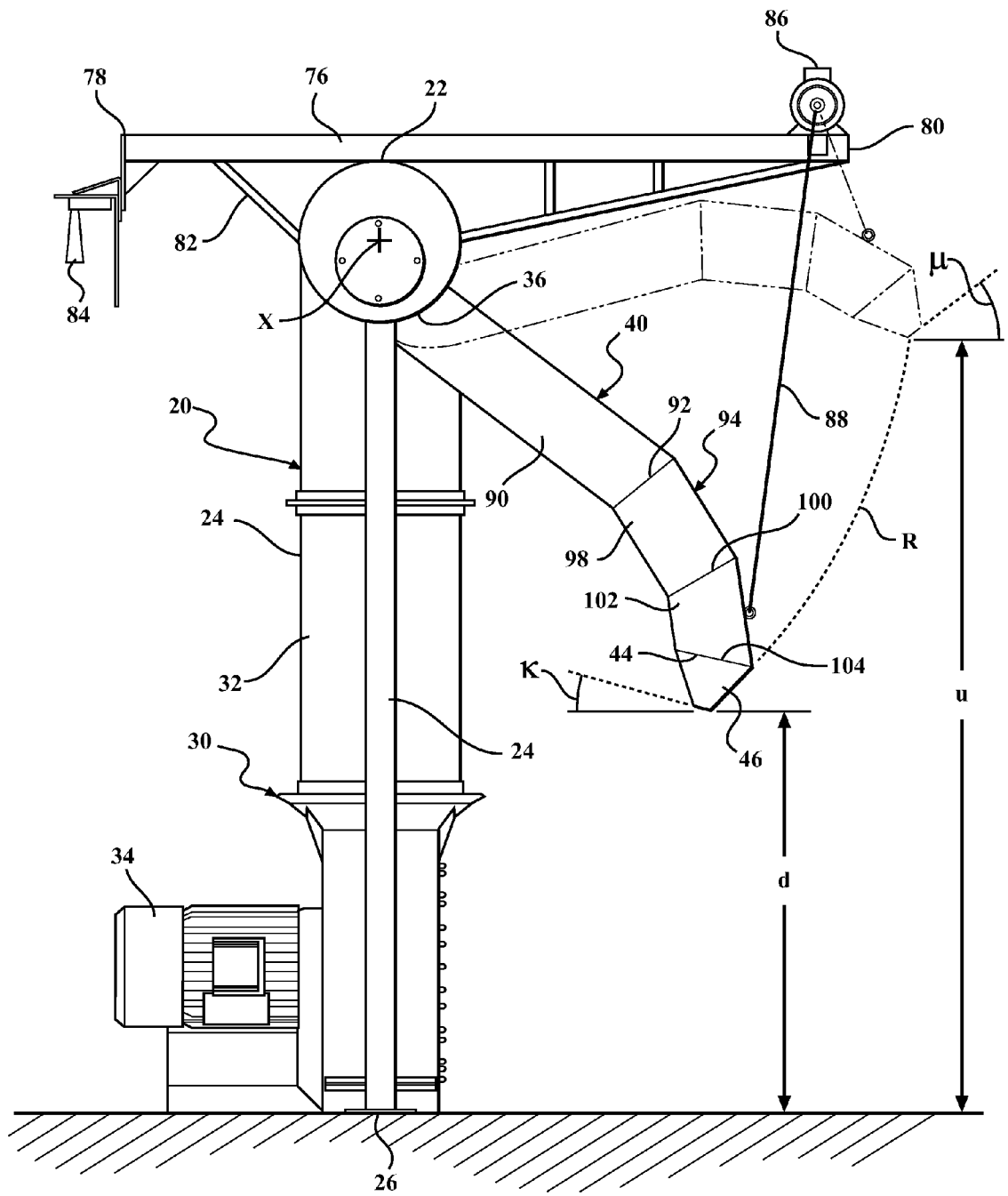
FIG. 2 is a side view of the assembly.
Figure 4:
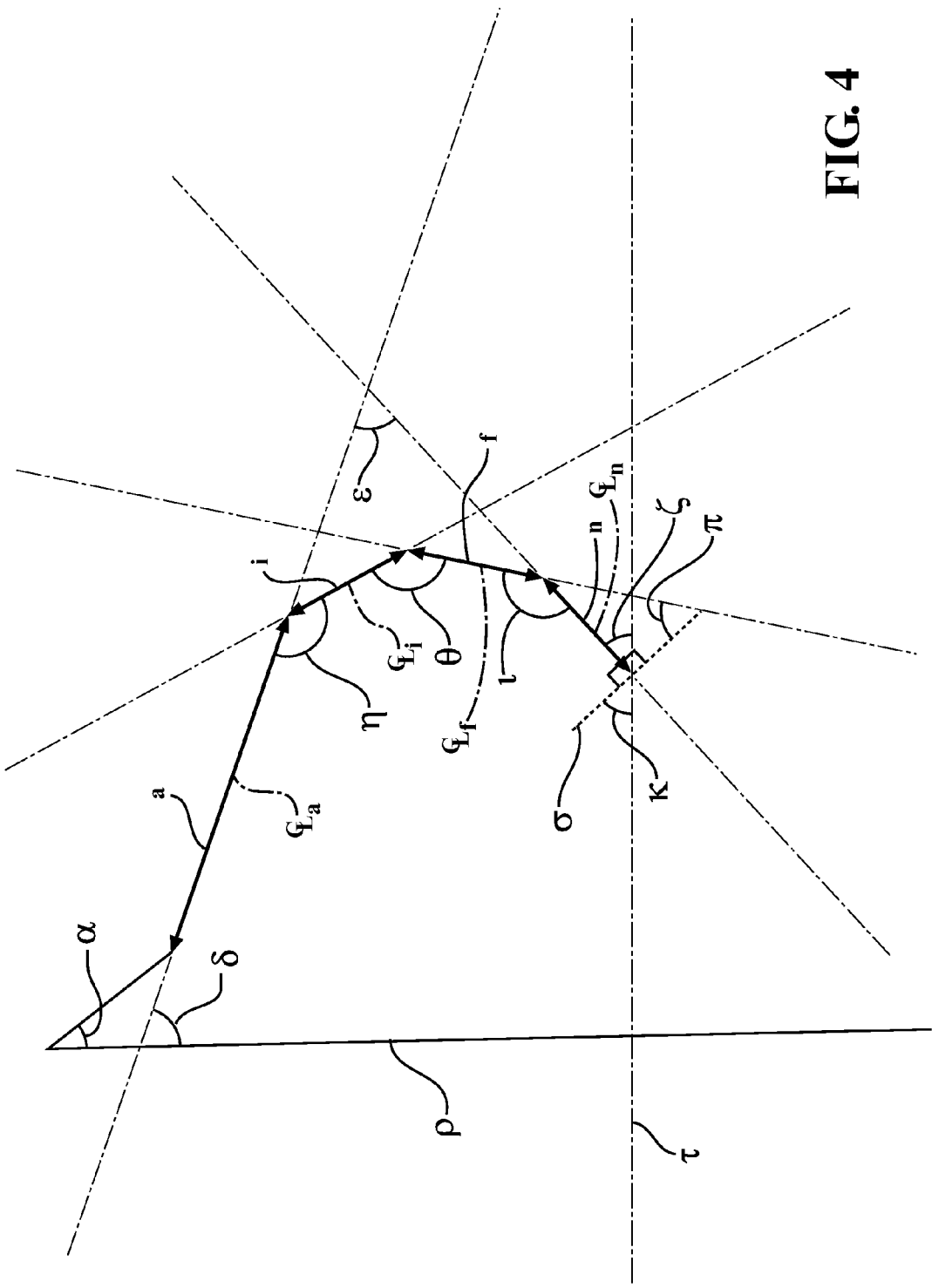
FIG. 4 is a diagram of the various centerlines and angles of the assembly.
Figure 5:
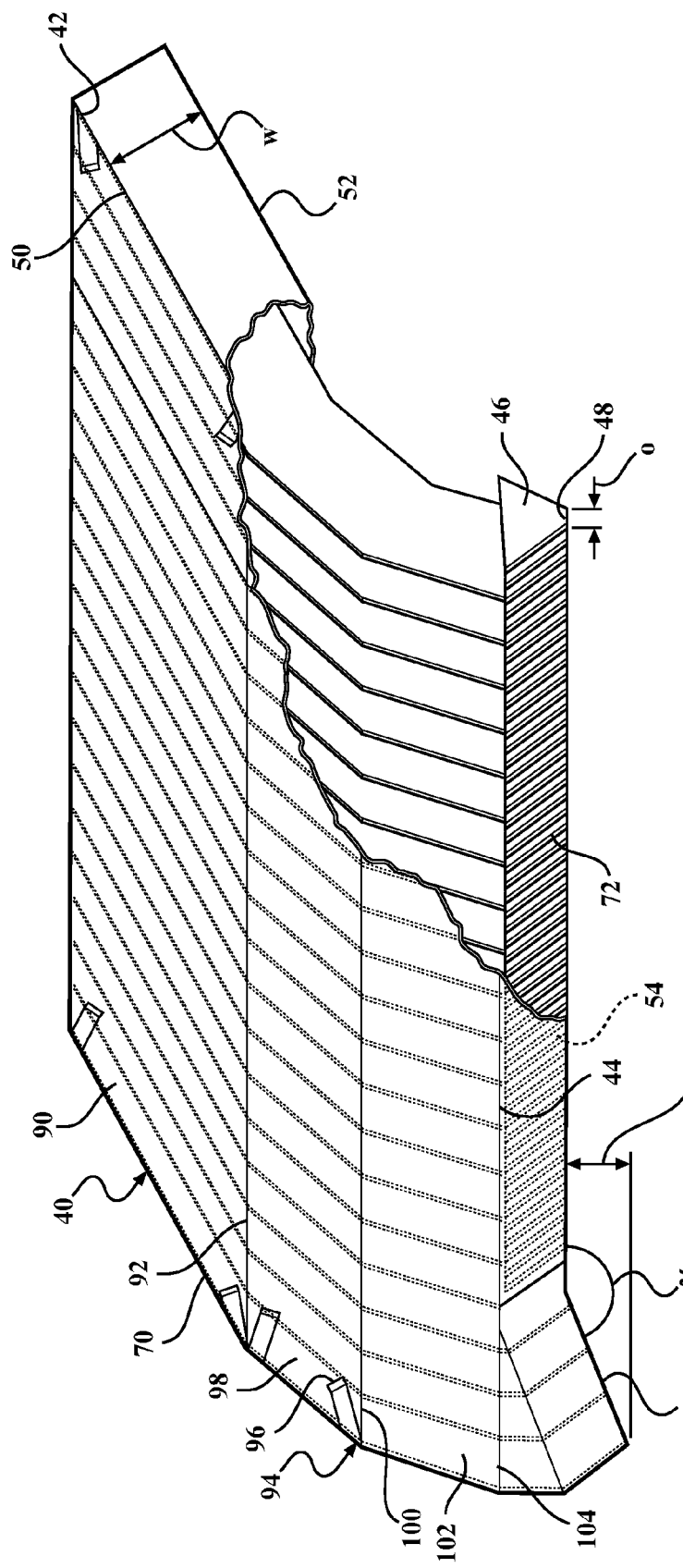
FIG. 5 is a perspective view of the bag of the assembly.
Figure 6:
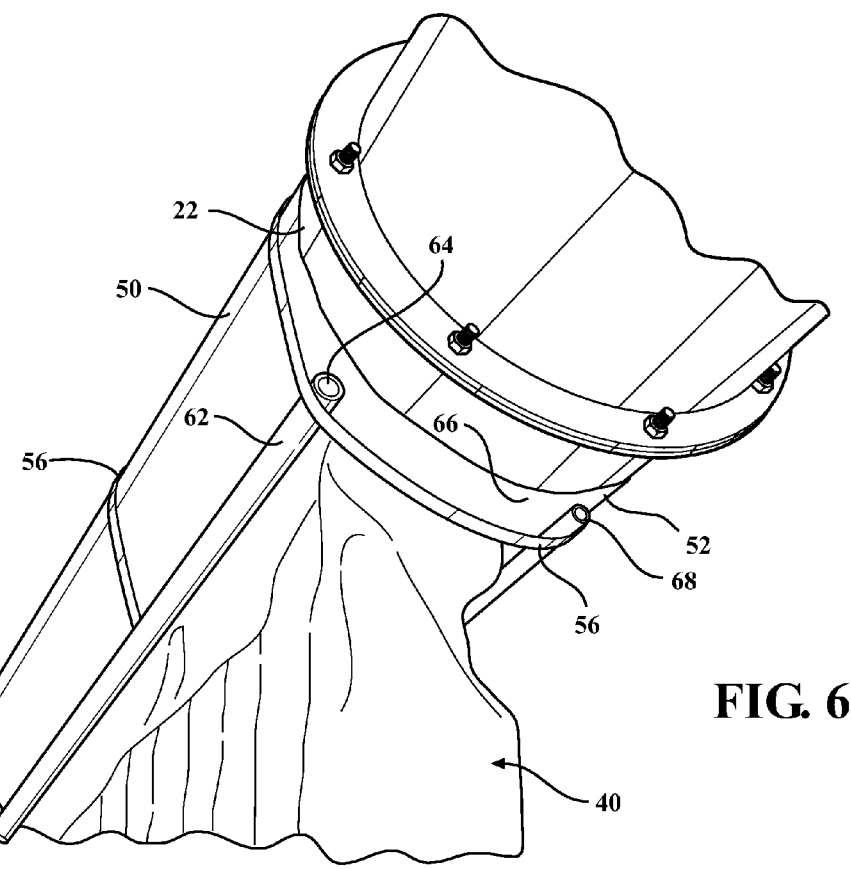
FIG. 6 is a perspective view of the bag attached to the top plenum of the assembly.
Figure 7:
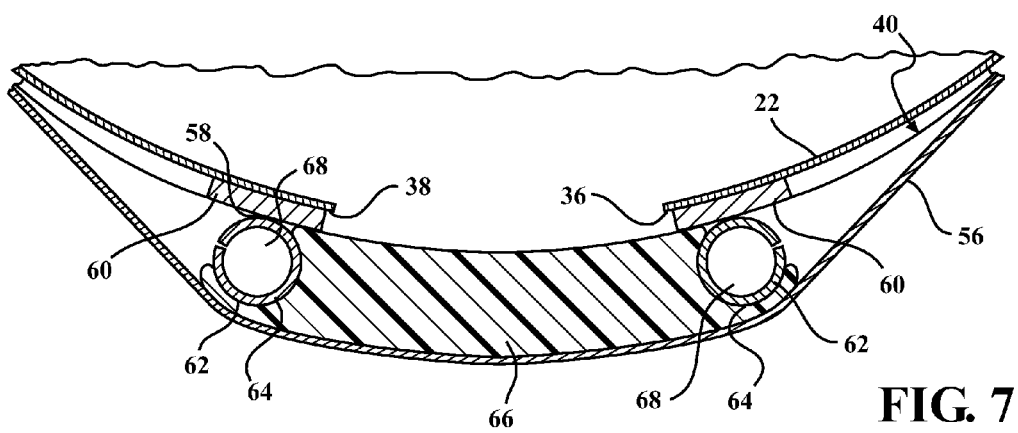
FIG. 7 is a cross-sectional view of the attachment of the bag to the top plenum of the assembly.

The top plenum 22 of the support 20 defines an attachment opening 36 with a rectangular periphery 38 centered to face radially from the top plenum axis X at an attachment angle $\alpha$ of 30° relative to the support plane $\rho$. A bag 40, as generally indicated, of flexible material defines an opening 42 of rectangular configuration attached about the periphery of the attachment opening 36 to extend downwardly at the attachment angle $\alpha$ from the top plenum 22 to a distal end 44 of the bag 40 while in an inflated and down position (shown in solid lines in FIG. 2). A nozzle 46 is disposed along a nozzle centerline $\mathcal{L}_n$ (shown in solid lines in FIG. 4) and the nozzle centerline $\mathcal{L}_n$ extends at a nozzle centerline distance n of six (6) inches from the distal end 44 of the bag 40 to define a nozzle opening 48. The nozzle opening 48 is disposed at a down position height d in a parallel direction forty seven (47) inches and from the support ends 26 in the down position in a parallel direction to the legs 24. The bag 40 at the down position defines a measured distance m of fifty four and three quarter (54¾) inches between the opening 42 of the bag 40 and the nozzle opening 48.

The bag 40 includes front and rear panels 50, 52 and bag gussets 54 to establish a width w of eight (8) inches between the panels 50, 52. The front and rear panels 50, 52 of the bag 40 with the bag gussets 54 wraparound the top plenum 22 and a plurality of bag bands 56 clamp over the bag 40 and the top plenum 22 to secure the bag 40 to attach the top plenum 22 of the support 20. The bag bands 56 define an attachment 58 for attaching the bag 40 to the attachment opening 36. The attachment 58 includes a plurality of sponge tapes 60 disposed about said attachment opening 36 of the top plenum 22 extending along said top plenum axis X and a plurality of bag clamp pipes 62 defining pipe ends 64 are disposed on the sponge tape 60 extending along the top plenum axis X. A rubber spacer 66 extends between each of the bag clamp pipes 62 sealing the front and rear panels 50, 52 of the bag 40 between the sponge tape 60 and the bag clamp pipe 62 to prevent air leakage. A plastic end plug 68 is disposed at each of said pipe ends 64 of said bag clamp pipes 62, The bag gussets 54 extend into the nozzle 46 to divide the bag 40 into sections and define bag sides 70 and the nozzle 46 extends between the bag sides 70 of the bag 40. The front and rear panels 50, 52 of the bag 40 converge in the nozzle 46 at a first inwardly inclined angle $\beta$ of 60° to define the nozzle opening 48 extending at a nozzle opening distance o of three quarters (¾) of an inch along a nozzle plane $\sigma$.

Figure 3:
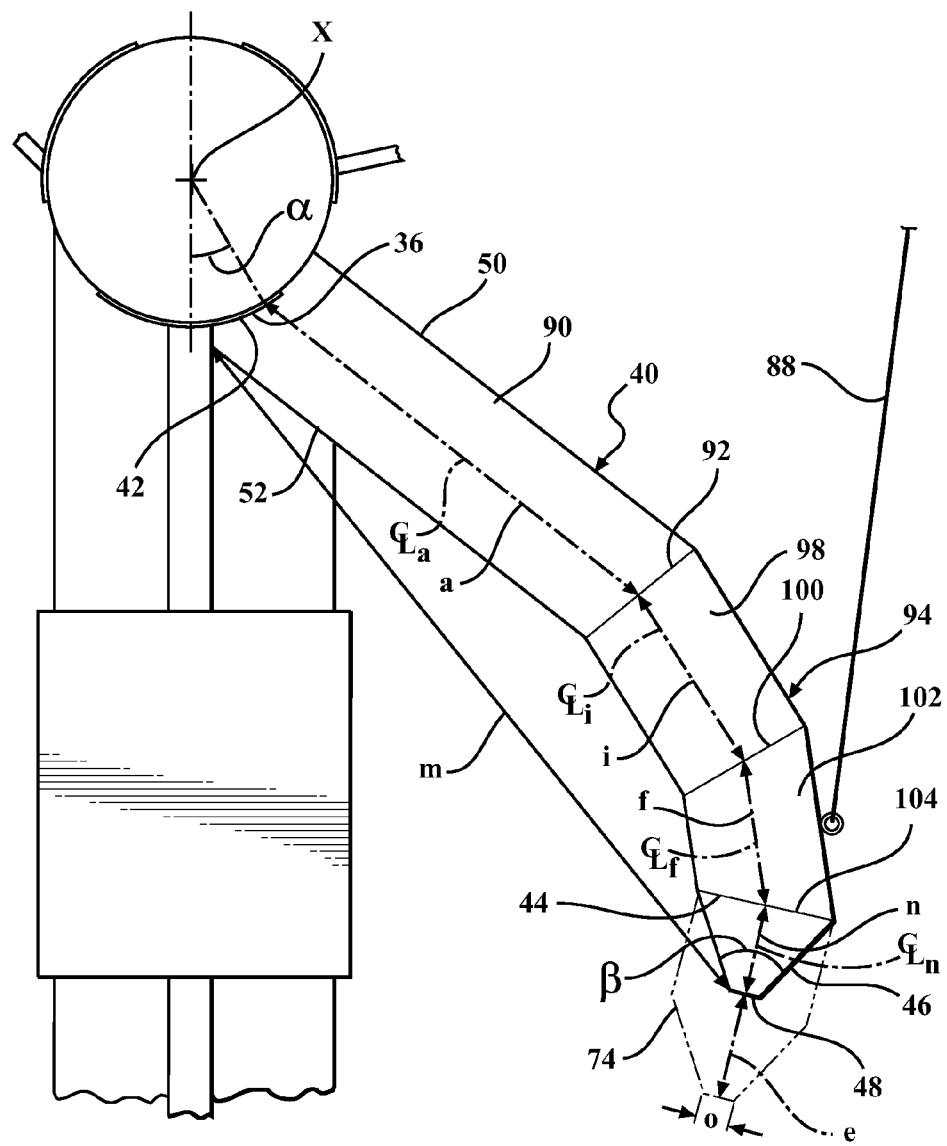
FIG. 3 is an enlarged fragmentary view of the assembly.

The lateral extent of the nozzle 46 includes a center portion 72 extending parallel to the top plenum 22 and two end portions 74 (shown in phantom lines in FIG. 3) 64 extending downwardly at an end portion distance e of six and thirteen sixteenth ($6^{13}/_{16}$) inches downwardly from the nozzle opening 48 of the center portion 72 and canted at a second inwardly inclined angle γ relative to the center portion 72 for directing air flow inwardly of the legs 24 toward the vehicle.

A horizontal beam 76 is disposed on the top plenum 22 and extending perpendicularly to the top plenum axis X to an incoming side length 78 and an exiting side length 80. A plurality of truss beams 82 extend from the top plenum 22 to the horizontal beam 76 to support 20 the horizontal beam 76. A vehicle recognition system 84 (VRS) is disposed on the incoming side length 78 of the horizontal beam 76 for detecting the surface of a vehicle. An electric motor 86 is disposed on the exiting side length 80 of the horizontal beam 76. A cord 88 connects the bag 40 to the motor for raising and lowering the bag 40 in an arc R from the down position (shown in solid lines in FIG. 2) relative to the top plenum 22.

The bag 40 includes a major length 90 disposed along a major centerline $\mathcal{L}_a$ (shown in solid lines in FIG. 4) extending from the top plenum 22 at a first bag acute angle δ of 45° relative to the support plane ρ to a first joint 92 when in the down position. The bag 40 includes a curved portion 94, as generally indicated, extending through an included angle ε of 115° between the major centerline $\mathcal{L}_a$ and the nozzle 46 to position the nozzle centerline $\mathcal{L}_n$ at a second bag acute angle ζ of 70° relating to a horizontal plane τ disposed perpendicularly to the legs 24 in the inflated position. The major centerline $\mathcal{L}_a$ of the major length 90 extends at a major centerline distance a of thirty one and one half (31½) inches from the attachment opening 36 of the top plenum 22 to the first joint 92. The bag 40 includes at least one D-ring 96 attached to the bag 40. The cord 88 attaches to the D-ring 96 for raising and lowering the bag 40 from the down position (shown in solid lines in FIG. 2) to an inflated and up position (shown in phantom lines in FIG. 2).

The curved portion 94 of the bag 40 includes a minor length 98 disposed on a minor centerline $\mathcal{L}_i$ (shown in solid lines in FIG. 4) wherein the major centerline $\mathcal{L}_a$ extends between 2.4 and 2.5 times longer than the minor centerline $\mathcal{L}_i$. The minor centerline $\mathcal{L}_i$ extends at a minor centerline distance i between twelve and three quarters (12¾) inches and thirteen and one eighth (13⅛) inches from the major centerline $\mathcal{L}_a$ to a second joint 100 at a first inclined angle η of 160° relative to the major centerline $\mathcal{L}_a$ in the down position (shown in solid lines in FIG. 2). The curved portion 94 of the bag 40 includes a filler length 102 disposed on a filler length centerline $\mathcal{L}_f$ (shown in solid lines in FIG. 4) wherein the minor centerline $\mathcal{L}_i$ extends between 1.3 and 1.4 times longer than the filler length centerline $\mathcal{L}_f$ and the filler length centerline $\mathcal{L}_f$ extends between 1.5 and 1.6 times longer than the nozzle centerline $\mathcal{L}_n$.

The filler length centerline $\mathcal{L}_f$ extends at a filler length centerline distance f between nine (9) inches and nine and three quarters (9¾) inches between trapezoidal shaped ends 104 of the filler length 102 and disposed between the minor length 98 and the nozzle 46 at a second inclined angle θ of 156° relative to the second centerline and at a third inclined angle ι of 159° relative to the nozzle centerline $\mathcal{L}_n$. The filler length centerline $\mathcal{L}_f$ intersects the nozzle plane σ at a fourth inclined angle π of 69° for positioning the nozzle 46 slanted open at a first nozzle acute angle κ of 20° forwardly relative to the horizontal plane τ disposed perpendicularly to the legs 24 of the support 20 in the down position (shown in solid lines in FIG. 2) and the nozzle opening 48 disposed at an up position height u of ninety (90) inches relative to the support ends 26 being slanted open at a second nozzle acute angle μ of 20° rearwardly relative to the horizontal plane τ disposed perpendicularly to the legs 24 of the support 20 in the up position (shown in phantom lines in FIG. 2). In other words, in the inflated position, the nozzle opening 48 of the nozzle 46 opens forwardly relative to the front surface of the vehicle to remove liquids from the front surface of the vehicle. In the up position, the nozzle opening 48 of the nozzle 46 opens rearwardly relative to the back surface of the vehicle to remove liquids from the back surface of the vehicle.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

| Element Symbol | Element Name |
| --- | --- |
| a | Major Centerline Distance |
| d | Down Position Height |
| e | End Portion Distance |
| f | Filler Length Centerline Distance |
| i | Minor Centerline Distance |
| m | Measured Distance |
| n | Nozzle Centerline Distance |
| o | Nozzle Opening Distance |
| R | Arc |
| u | Up Position Height |
| w | Width |
| X | Top plenum axis |
| 20 | Support |
| 22 | top plenum |
| 24 | Leg |
| 26 | support end |
| 28 | Arrow |
| 30 | air supply |
| 32 | duct |
| 34 | Blower |
| 36 | Attachment Opening |
| 38 | Rectangular Periphery |
| 40 | bag |
| 42 | Opening |
| 44 | Distal End |
| 46 | Nozzle |
| 48 | nozzle opening |
| 50 | Front panel |
| 52 | rear panel |
| 54 | bag gussets |
| 56 | Bag Band |
| 58 | Attachment |
| 60 | Sponge Tape |
| 62 | Bag Clamp Pipe |
| 64 | Pipe End |
| 66 | Rubber Spacer |
| 68 | Plastic End Plug |
| 70 | bag side |
| 72 | Center Portion |

-continued

| Element Symbol | Element Name |
|---|---|
| 74 | End portion |
| 76 | Horizontal Beam |
| 78 | Incoming Side Length |
| 80 | Exiting Side Length |
| 82 | Truss Beam |
| 84 | Vehicle Recognition System |
| 86 | Electric Motor |
| 88 | Cord |
| 90 | Major Length |
| 92 | First Joint |
| 94 | Curved Portion |
| 96 | D-Ring |
| 98 | Minor Length |
| 100 | Second Joint |
| 102 | Filler Length |
| 104 | Trapezoidal Shaped Ends |
| μ | Second Nozzle Acute Angle |
| π | Fourth inclined angle |
| η | First Inclined Angle |
| ρ | Support Plane |
| τ | Horizontal Plane |
| β | First Inwardly Inclined Angle |
| ι | Third Inclined Angle |
| ζ | Second Bag Acute Angle |
| α | Attachment Angle |
| δ | First bag acute angle |
| ε | Included Angle |
| γ | Second Inwardly Inclined Angle |
| κ | First Nozzle Acute Angle |
| σ | Nozzle Plane |
| θ | Second Inclined Angle |
| $\mathcal{L}_a$ | Major Centerline |
| $\mathcal{L}_f$ | Filler Length Centerline |
| $\mathcal{L}_i$ | Minor Centerline |
| $\mathcal{L}_n$ | Nozzle centerline |

What is claimed is:

1. An assembly for removing liquids from surfaces of a vehicle comprising;
a support (20) defining a top plenum (22) for distributing air disposed along a top plenum axis (X) defining an attachment opening (36) and in a support plane (ρ) extending through said top plenum axis (X) from said top plenum (22) for supporting the assembly in a support plane (ρ),
said attachment opening (36) disposed radially from said top plenum axis (X) at an attachment angle (α) relative to said support plane (ρ),
a bag (40) having an opening (42) attached to said attachment opening (36) of said top plenum (22) to extend downwardly from said top plenum (22) to a distal end (44) in an inflated and down position being movable relative to said top plenum (22) in an arc (R) between said down position and an inflated and up position,
a nozzle (46) disposed on a nozzle centerline ($\mathcal{L}_n$) at said distal end (44) of said bag (40) to define a nozzle opening (48) disposed in a nozzle plane (σ) transverse to said nozzle centerline ($\mathcal{L}_n$),
characterized by
said nozzle plane (σ) of said nozzle (46) being slanted open toward said support plane (ρ) at a first nozzle acute angle (κ) in said down position and being slanted open from said support plane (ρ) at a second nozzle acute angle (μ) in said up position.

2. An assembly as set forth in claim 1 wherein said bag (40) at said down position defines a measured distance (m) of fifty four and three quarter (54¾) inches between said opening (42) of said bag (40) and said nozzle opening (48).

3. An assembly as set forth in claim 1 wherein each of said nozzle acute angles (κ, μ) equals 20° relative to a horizontal plane (τ) disposed perpendicularly to said support plane (ρ).

4. An assembly as set forth in claim 1 wherein said bag (40) includes a major length (90) disposed along a major centerline ($\mathcal{L}_a$) extending from said top plenum (22) at a first bag acute angle (δ) to a first joint (92), said bag (40) including a curved portion (94) extending through an included angle (ε) of less than 180° between said major centerline ($\mathcal{L}_a$) and said nozzle centerline ($\mathcal{L}_a$) to position said nozzle centerline ($\mathcal{L}_n$) at an second bag acute angle (ζ) relative to said horizontal plane (τ) disposed perpendicularly to said support plane (ρ) in said down position.

5. An assembly as set forth in claim 4 wherein said attachment angle (α) is 30° relative to said support plane (ρ) and said first bag acute angle (δ) is 45° relative to said support plane (ρ).

6. An assembly as set forth in claim 4 wherein the ratio of said major length (90) to said curved portion (94) is within 10% of 3:2.

7. An assembly as set forth in claim 4 wherein said major centerline ($\mathcal{L}_a$) extends at a major centerline distance (a) of thirty one and one half (31½) inches from said top plenum (22) to said first joint (92).

8. An assembly as set forth in claim 4 wherein said included angle (ε) is substantially 115° to position said second bag acute angle (ζ) at 70° relative to said horizontal plane (τ).

9. An assembly as set forth in claim 8 wherein said curved portion (94) of said bag (40) includes a minor length (98) disposed on a minor centerline ($\mathcal{L}_i$) extending from said first joint (92) of said major length (90) to a second joint (100).

10. An assembly as set forth in claim 9 wherein said curved portion (94) of said bag (40) includes a filler length (102) disposed on a filler length centerline ($\mathcal{L}_f$) extending between said minor length (98) and said nozzle plane (σ).

11. An assembly as set forth in claim 9 wherein said major centerline ($\mathcal{L}_a$) of said major length (90) extends between 2.4 and 2.5 times longer than said minor centerline ($\mathcal{L}_i$) of said minor length (98).

12. An assembly as set forth in claim 10 wherein said minor centerline ($\mathcal{L}_i$) extends between 1.3 and 1.4 times longer than said filler length centerline ($\mathcal{L}_f$).

13. An assembly as set forth in claim 10 wherein said filler length centerline ($\mathcal{L}_f$) extends between 1.5 and 1.6 times longer than said nozzle centerline ($\mathcal{L}_a$).

14. An assembly as set forth in claim 9 wherein said minor centerline ($\mathcal{L}_i$) extends at a minor centerline distance (i) between twelve and three quarters (12¾) inches and thirteen and one eighth (13⅛) inches from said major centerline ($\mathcal{L}_a$) to said second joint (100).

15. An assembly as set forth in claim 10 wherein said filler length (102) includes trapezoidal shaped ends (104) and said filler length centerline ($\mathcal{L}_f$) extends at a filler length centerline distance (f) between nine inches (9) and nine and three quarters (9¾) inches between said trapezoidal shaped ends (104).

16. An assembly as set forth in claim 10 wherein said included angle (ε) comprises of a first inclined angle (η) between said major centerline ($\mathcal{L}_a$) and said minor centerline ($\mathcal{L}_i$), a second inclined angle (θ) between said minor centerline ($\mathcal{L}_i$) and said filler length centerline ($\mathcal{L}_f$), and a third inclined angle (ι) between said filler length centerline ($\mathcal{L}_f$) and said nozzle centerline ($\mathcal{L}_a$) with each of said inclined angles (η, ι, θ) being within 5° of one another.

17. An assembly as set forth in claim 16 wherein said minor centerline ($\mathcal{L}_i$) extends between said first joint (92) of said major length (90) to said second joint (100) defining said first inclined angle (η) being 160° relative to said major centerline ($\mathcal{L}_a$).

18. An assembly as set forth in claim 16 wherein said filler length centerline ($\mathcal{L}_f$) extends between said minor length (98) and said nozzle centerline ($\mathcal{L}_a$) defining said second inclined angle (θ) being 156° relative to said minor centerline ($\mathcal{L}_i$).

19. An assembly as set forth in claim 16 wherein said filler length centerline ($\mathcal{L}_f$) extends between said minor length (98) and said nozzle centerline ($\mathcal{L}_a$) defining said third inclined angle (ι) being 159° relative to said nozzle centerline ($\mathcal{L}_a$).

20. An assembly as set forth in claim 16 wherein said filler length centerline ($\mathcal{L}_f$) intersects said nozzle plane (σ) defining a fourth inclined angle (π) of 69° relative to said filler length centerline ($\mathcal{L}_f$).

21. An assembly as set forth in claim 1 wherein said top plenum (22) includes an air supply (30) including a duct (32) for supplying air to said top plenum (22) and a blower (34) in fluid communication with said duct (32) for providing a flow of air to said supply duct (32) and said top plenum (22).

22. An assembly as set forth in claim 1 wherein said attachment opening (36) includes a rectangular periphery (38) centered to face radially from said top plenum axis (X) at said attachment angle (α) relative to said support plane (ρ).

23. An assembly as set forth in claim 1 wherein said nozzle centerline ($\mathcal{L}_n$) extends at a nozzle centerline distance (n) of six (6) inches from said distal end (44) of said bag (40) to said nozzle opening (48).

24. An assembly as set forth in claim 1 wherein in said down position said nozzle opening (48) is disposed along said nozzle plane (σ) and at a down position height (d) of forty seven (47) inches in a parallel direction and from said support ends (26).

25. An assembly as set forth in claim 1 wherein said bag (40) includes front and rear panels (50, 52) and bag gussets (54) to establish a width (w) of eight (8) inches between said panels (50, 52), said front and rear panels (50, 52) converge in said nozzle (46) at a first inwardly inclined angle (β) of 60° to define said nozzle opening (48) extending at a nozzle opening distance (o) of three quarters (¾) of an inch along said nozzle plane (σ).

26. An assembly as set forth in claim 1 further includes a horizontal beam (76) disposed on said top plenum (22) and extending perpendicularly to said top plenum axis (X) to an incoming side length (78) and an exiting side length (80).

27. An assembly for removing liquids from surfaces of a vehicle comprising;
- a support (20) of generally inverted U-shape defining a top plenum (22) for distributing air and extending along a top plenum axis (X) and a pair of legs (24) extending downwardly from said top plenum (22) in a spaced and parallel relationship to support ends (26) for engaging a floor,
- said legs (24) of said support (20) being vertically disposed in a support plane (ρ) extending through said top plenum axis (X) to define a drive through-lane indicated by an arrow (28),
- one of said legs (24) defining an air supply (30) including a duct (32) for supplying air to said top plenum (22) and said air supply (30) including a blower (34) in fluid communication with said duct (32) for providing a flow of air to said supply duct (32) and said top plenum (22),
- said top plenum (22) defining an attachment opening (36) with a rectangular periphery (38) centered to face radially from said top plenum axis (X) at an attachment angle (α) of 30° relative to said support plane (ρ),
- a bag (40) of flexible material defining an opening (42) of rectangular configuration attached about said rectangular periphery (38) of said attachment opening (36) to extend downwardly at said attachment angle (α) from said top plenum (22) to a distal end (44) of said bag (40) in an inflated and down position,
- a nozzle (46) disposed along a nozzle centerline ($\mathcal{L}_n$) wherein said nozzle centerline ($\mathcal{L}_n$) extends at a nozzle centerline distance (n) of six (6) inches from said distal end (44) of said bag (40) to define a nozzle opening (48) disposed at a down position height (d) of forty seven (47) inches in a parallel direction and from said support ends (26) in said down position,
- said bag (40) at said down position defining a measured distance (m) of fifty four and three quarter (54¾) inches between said opening (42) of said bag (40) and said nozzle opening (48),
- said bag (40) including front and rear panels (50, 52) and bag gussets (54) to establish a width (w) of eight (8) inches between said panels (50, 52),
- said front and rear panels (50, 52) of said bag (40) with said bag gussets (54) wrapping around said top plenum (22) and a plurality of bag bands (56) clamping over said bag (40) to attach said bag (40) to said top plenum (22) of said support (20),
- said bag bands (56) defining an attachment (58) for attaching said bag (40) to said attachment opening (36),
- said attachment (58) including a plurality of sponge tapes (60) disposed about said attachment opening (36) extending along said top plenum axis (X),
- a plurality of bag clamp pipes (62) defining pipe ends (64) disposed on said sponge tapes (60) extending along said top plenum axis (X),
- a rubber spacer (66) extending between said bag clamp pipes (62) sealing said front and rear panels (50, 52) of said bag (40) between said sponge tape (60) and said bag clamp pipe (62) to prevent air leakage,
- a plastic end plug (68) is disposed at each of said pipe ends (64) of said bag clamp pipes (62),
- said bag gussets (54) extending into said nozzle (46) to divide said bag (40) into sections and defining bag sides (70) of said bag (40),
- said nozzle (46) extending between said bag sides (70),
- said front and rear panels (50, 52) converging in said nozzle (46) at a first inwardly inclined angle (β) of 60° to define said nozzle opening (48) extending at a nozzle opening distance (o) of three quarters (¾) of an inch along a nozzle plane (σ),
- said nozzle (46) including a center portion (72) extending parallel to said top plenum (22) and two end portions (74) extending at an end portion distance (e) of six and thirteen sixteenth (6¹³⁄₁₆) inches downwardly from said nozzle opening (48) and canted at a second inwardly inclined angle (γ) relative to said center portion (72) for directing air flow toward the vehicle,
- a horizontal beam (76) disposed on said top plenum (22) and extending perpendicularly to said top plenum axis (X) to an incoming side length (78) and an exiting side length (80),
- a plurality of truss beams (82) extending from said top plenum (22) to said horizontal beam (76) to support (20) said horizontal beam (76),
- a vehicle recognition system (84) (VRS) disposed on said incoming side length (78) of said horizontal beam (76) for detecting the surface of a vehicle, an electric motor (86) disposed on said exiting side length (80) of said horizontal beam (76), a cord (88) connecting said bag (40) to said motor for raising and lowering said bag (40) in an arc (R) from said down position relative to said top plenum (22), said bag (40) including a major length (90) disposed along a major centerline ($\mathcal{L}_a$) extending from said top plenum (22) at a first bag acute angle (δ) of 45° relative to said support plane (ρ) to a first joint (92), said bag (40) including a curved portion (94) extending through an included angle (ε) of 115° between said major centerline ($\mathcal{L}_a$) and said nozzle (46) to position said nozzle centerline ($\mathcal{L}_n$) at a second bag acute angle (ζ) of 70° relating to a horizontal plane (τ) disposed perpendicularly to said legs (24) in said down position, said major centerline ($\mathcal{L}_a$) of said major length (90) extending at a major centerline distance (a) of thirty one and one half (31½) inches from said attachment opening (36) of said top plenum (22) to said first joint (92), said bag (40) including at least one D-ring (96) attached to said bag (40), said cord (88) attaching to said D-ring (96) for raising and lowering said bag (40) from said down position to an inflated and up position, and characterized by, said curved portion (94) of said bag (40) including a minor length (98) disposed on a minor centerline ($\mathcal{L}_i$) wherein said major centerline ($\mathcal{L}_a$) extends between 2.4 and 2.5 times longer than said minor centerline ($\mathcal{L}_i$), said minor centerline ($\mathcal{L}_i$) extending at a minor centerline distance (i) between twelve and three quarters (12¾) inches and thirteen and one eighth (13⅛) inches from said major centerline ($\mathcal{L}_a$) to a second joint (100) at a first inclined angle (η) of 160° relative to said major centerline ($\mathcal{L}_a$) in said inflated position, said curved portion (94) of said bag (40) including a filler length (102) disposed on a filler length centerline ($\mathcal{L}_f$) wherein said minor centerline ($\mathcal{L}_i$) extends between 1.3 and 1.4 times longer than said filler length centerline ($\mathcal{L}_f$) and said filler length centerline ($\mathcal{L}_f$) extends between 1.5 and 1.6 times longer than said nozzle centerline ($\mathcal{L}_n$), said filler length centerline ($\mathcal{L}_f$) extending at a filler length centerline distance (f) between nine (9) inches and nine and three quarters (9¾) inches between trapezoidal shaped ends (104) of said filler length (102) and disposed between said minor length (98) and said nozzle (46) at a second inclined angle (θ) of 156° relative to said second centerline and at a third inclined angle (ι) of 159° relative to said nozzle centerline ($\mathcal{L}_n$), said filler length centerline ($\mathcal{L}_f$) intersecting said nozzle plane (σ) at a fourth inclined angle (π) of 69° for positioning said nozzle (46) being slanted open at a first nozzle acute angle (κ) of 20° forwardly relative to said horizontal plane (τ) disposed perpendicularly to said legs (24) of said support (20) in said down position and said nozzle opening (48) disposed at an up position height (u) of ninety (90) inches relative to said support ends (26) being slanted open at a second nozzle acute angle (μ) of 20° rearwardly relative to said horizontal plane (ι) disposed perpendicularly to said legs (24) of said support (20) in said up position.

* * * * *